Sept. 15, 1953
C. GABRIELSEN
2,652,304
CANDY MERCHANDISING MACHINE
Filed Oct. 27, 1950
4 Sheets—Sheet 1
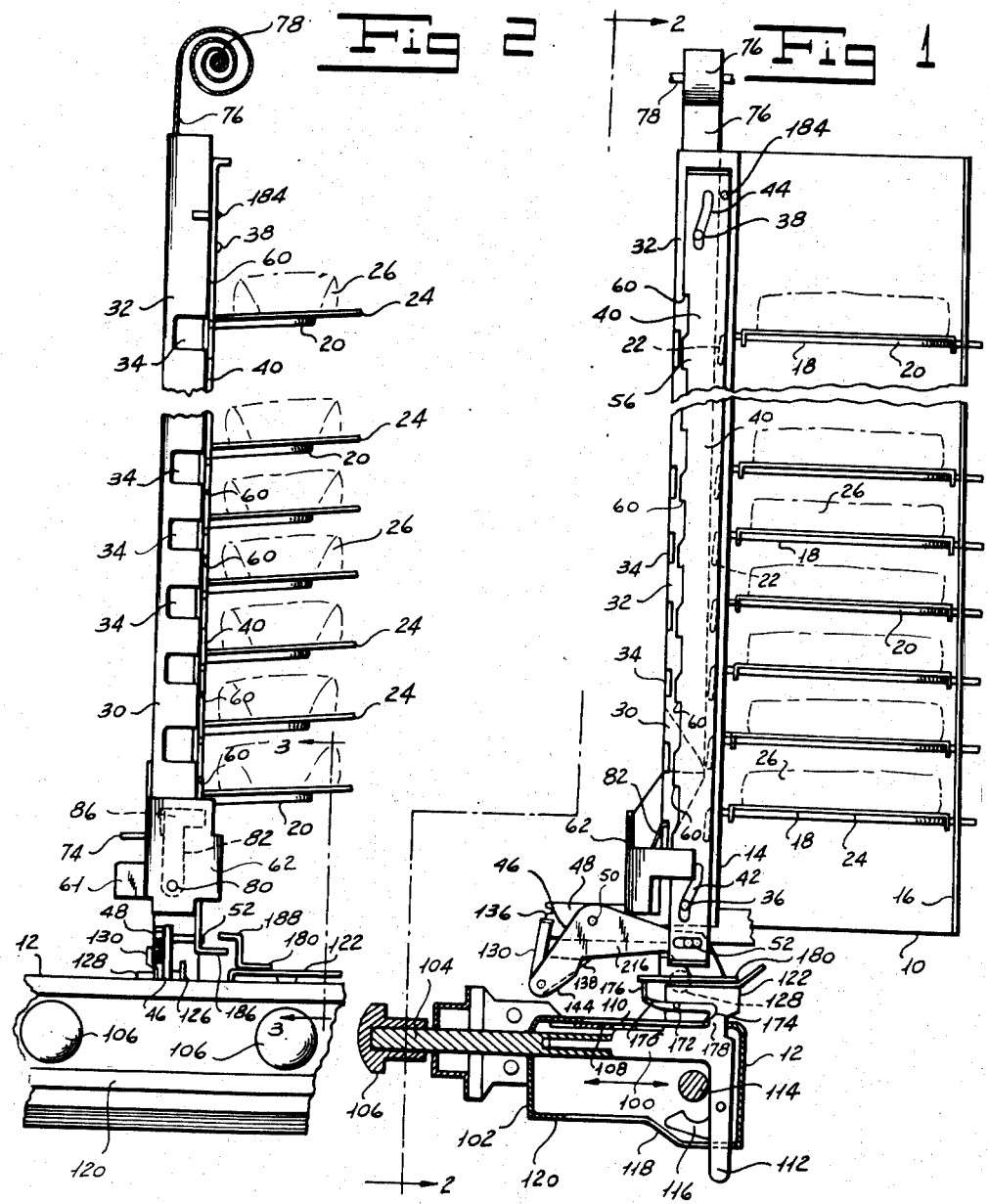
INVENTOR.
CHRISTIAN GABRIELSEN
BY
ATTORNEY Sept. 15, 1953  
C. GABRIELSEN  
2,652,304  
CANDY MERCHANDISING MACHINE  
Filed Oct. 27, 1950  
4 Sheets-Sheet 2
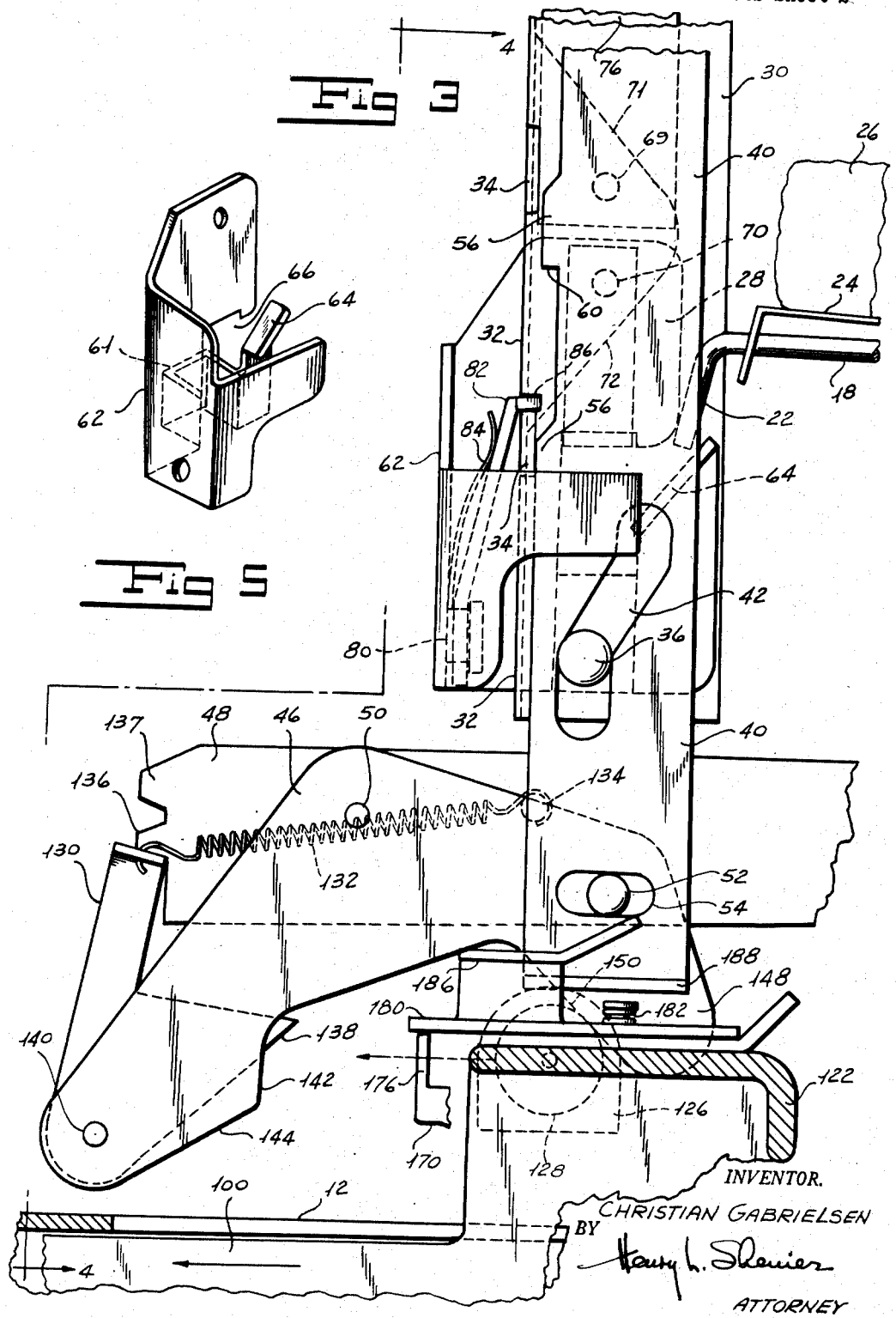
INVENTOR.  
CHRISTIAN GABRIELSEN  
BY  
ATTORNEY

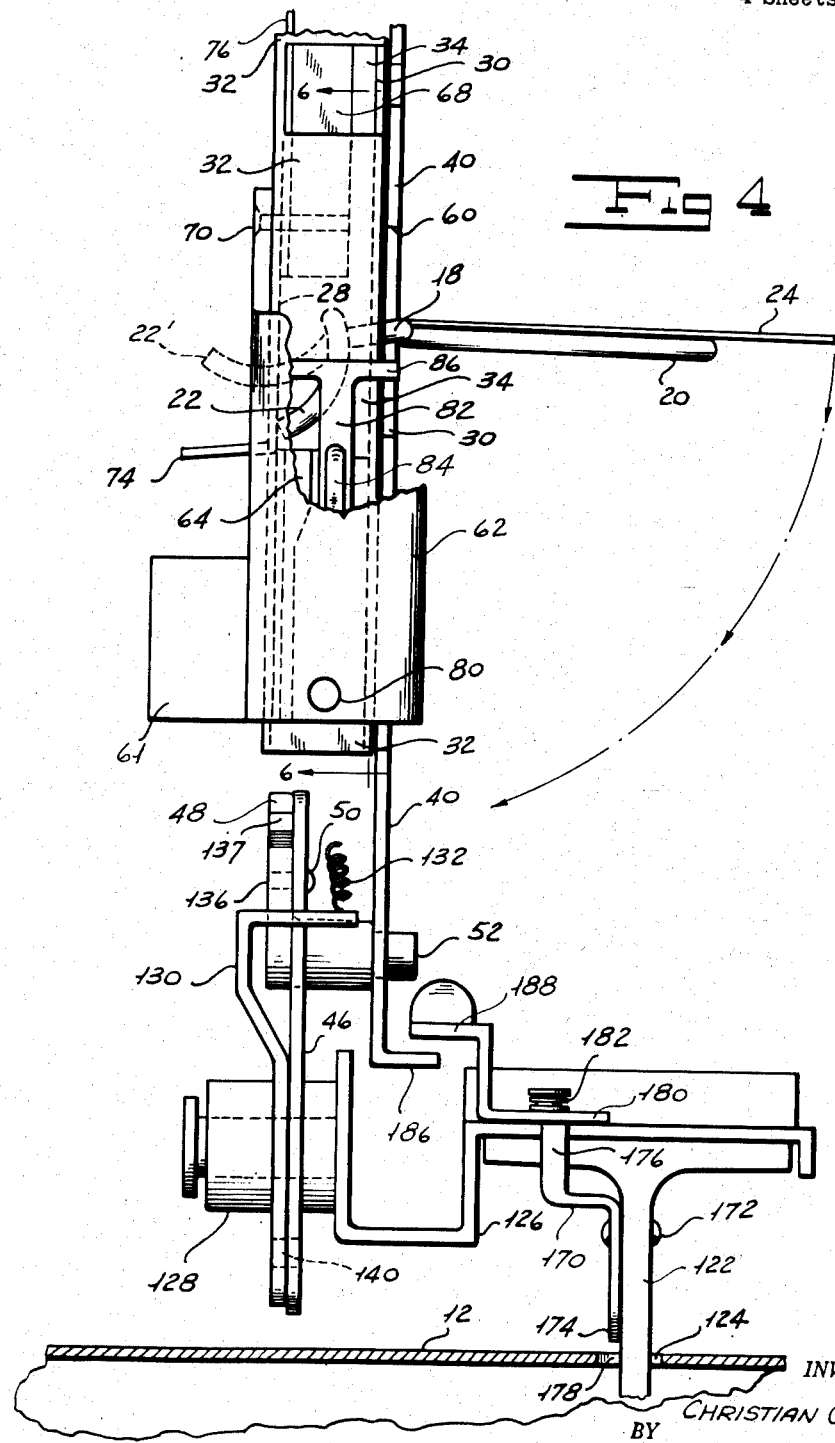

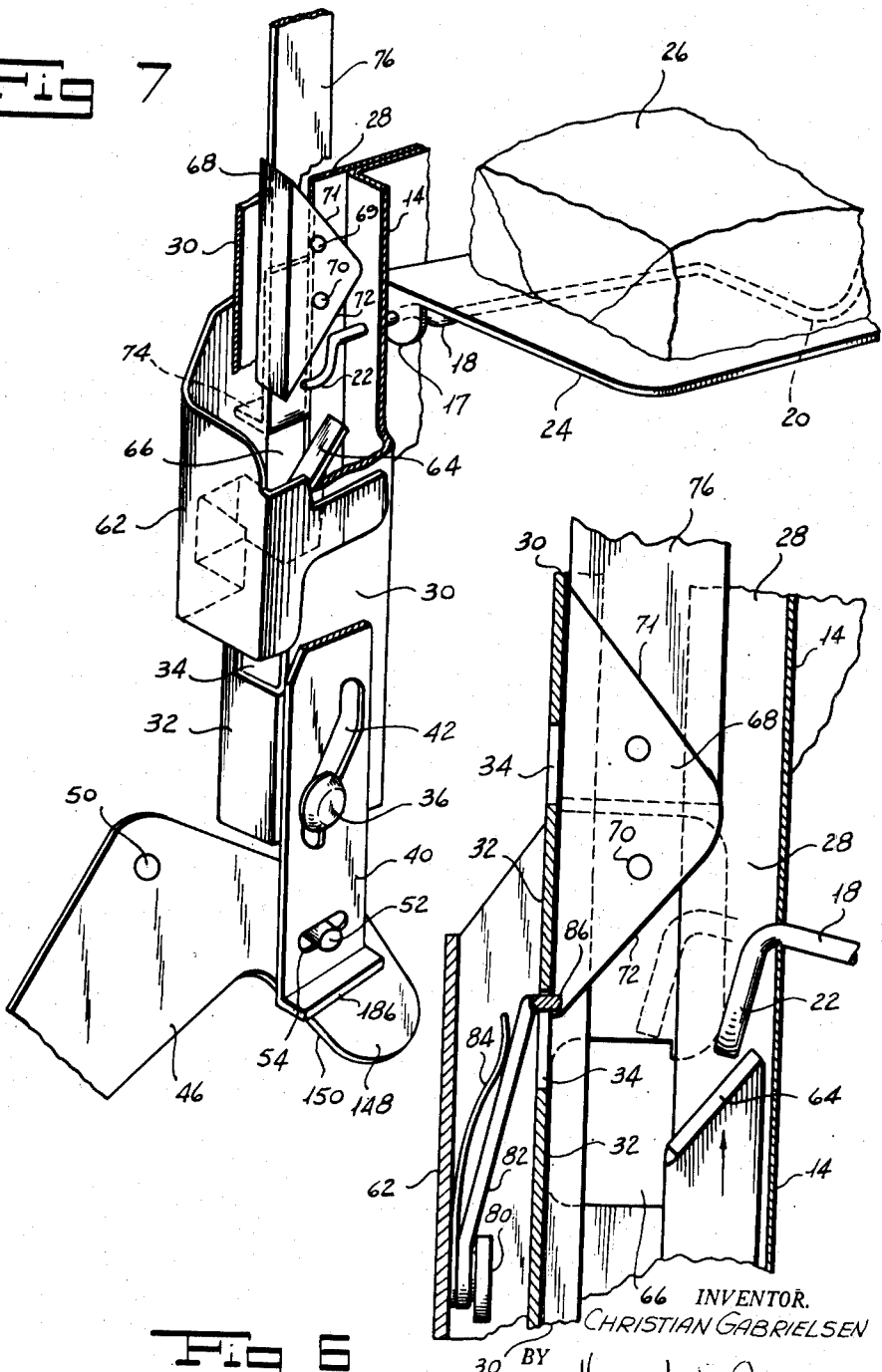

Patented Sept. 15, 1953

2,652,304

UNITED STATES PATENT OFFICE 2,652,304

CANDY MERCHANDISING MACHINE

Christian Gabrielsen, Whippany, N. J., assignor to Rowe Manufacturing Co., Inc., Whippany, N. J., a corporation of New York Application October 27, 1950, Serial No. 192,485

9 Claims. (Cl. 312—94)

My invention relates to a candy merchandising machine and more particularly to a coin controlled machine adapted to vend candy bars or other merchandise in a simple, convenient and expeditious manner.

Cigarettes are vended by vending machines of many various types, all of which include the principle of stacking the packages of cigarettes one upon the other and pushing a pack from the stack. Due to the uniform shape of cigarette packages and the fact that they are wrapped in glossy or smooth material, this type of vending machine is peculiarly adapted to the merchandising of cigarettes.

A great many articles, however, which are suitable for sale by means of automatic merchandising machines, such as candy bars and the like, are not only irregular in shape but would become deformed or squeezed out of shape if they were stacked. Accordingly, candy vending machines must make provision for storing or supporting each article separately. This makes for a machine of limited capacity which must be serviced frequently, tending to make the operation of candy machines uneconomical.

One type of automatic merchandising machine suitable for vending candy bars avoids many of the objections of the prior art and is shown in my copending application Serial No. 114,614, filed September 8, 1949, now matured into Pat. No. 2,565,766, dated August 28, 1951. In the merchandising machine there shown, candy bars are stored on pivoted shelves which are released in succession by a suitable coin control releasing mechanism involving a flexible tape. Due to the fact that the tape must support all of the shelves in horizontal position, friction on the tape creates a resistance which must be overcome during its operation, giving the operating handles of my prior machine a rather stout pull.

One object of this invention is to provide a candy merchandising machine adapted to vend articles which cannot be stacked in a simple, convenient and expeditious manner and in which the pull on the operating bar to operate the machine is greatly reduced.

Another object of my invention is to provide a candy merchandising machine for candy bars and the like having a large capacity.

Another object of my invention is to provide a candy merchandising machine which is flexible in design, simple and inexpensive in its construction and certain in its operation.

Other and further objects of my invention will appear from the following description.

In the accompanying drawings which form part of the instant specification and which are to be read in conjunction therewith and in which like reference numerals are used to indicate like parts in the various views:

Figure 1 is a sectional elevation of a candy merchandising machine showing one embodiment of my invention.

Figure 2 is a front elevation viewed along the line 2—2 of Figure 1.

Figure 3 is a sectional elevation drawn on an enlarged scale along the line 3—3 of Figure 2.

Figure 4 is a front elevation viewed along the line 4—4 of Figure 3.

Figure 5 is a perspective view of a detail of my assembly showing the traveling cam.

Figure 6 is a sectional view taken along the line 6—6 of Figure 4.

Figure 7 is a fragmentary perspective view of part of my operating mechanism with parts broken away showing details of the assembly.

In general, my invention contemplates the provision of a plurality of pivoted shelves each formed with a crank rotatable with the shelf. The crank normally rests upon an upright member and supports the shelf in a horizontal position adapted to vend merchandise such as candy bars and the like. The shelves are positioned one above the other and means are provided for camming the crank from the stationary support laterally to the side clear of the support to permit the shelves to pivot in succession from the top to the bottom. The candy bars or other merchandise supported on the shelves are thus successively dumped to a delivery chute for delivery to a user. A traveling cam is adapted to be released in stepwise fashion by a normally locked assembly. The traveling cam is urged upwardly by a spring such as a reversely wound spring in which the pull of the spring is uniform irrespective of the distance through which it acts. When the uppermost shelf is unloaded, an empty lock prevents further operation of the releasing mechanism. The normally locked releasing mechanism is released in response to coins of the proper denomination. Merchandise is selected by pulling a knob opposite a respective column.

The coin register adapted to release the locking bar of my merchandising machine may be of any suitable type but I prefer to use the coin register shown in copending application Christian Gabrielsen and John F. Morrison, Serial No. 166,045, filed June 3, 1950. This coin register is adapted to vend merchandise for various prices and will take any combination of nickels and dimes as well as a quarter and give change as required.

More particularly referring now to the drawings, a plurality of vertical members 10 are supported in any suitable manner from a frame 12 and lodged in a suitable cabinet or casing of any desirable construction (not shown). Each of the vertical members 10 is provided with a pair of flanges 14 and 16 which pivotally support a plurality of horizontally disposed wire support members 18. Each of the wires is formed with a bent portion 20 and a crank 22. Each of the wires, furthermore, is associated with a shelf 24 adapted to be supported by the bent portion 20 and to support merchandise 26 such as candy bars or the like upon the shelves, there being one candy bar to each shelf. The wire 18 is not only pivoted in the flanges 14 and 16 but is lodged to move laterally traversely to the flanges 14 and 16. Normally, each crank 22 has its end resting against a vertical flange 28 carried by the frame 12 and forming a right angle with the flange 14. The construction can readily be seen by reference to Figure 7. Secured to or forming part of the flange 14 I provide a channel member 30 which extends upwardly in a vertical direction. The channel member 30 is provided with a flange 32 formed with a number of openings 34. The channel member 30 carries a pin 36 adjacent its lower end and a pin 38 adjacent its upper end. A vertically extending reciprocating member 40 is mounted on the pins 36 and 38 by means of a pair of cam slots 42 coacting with pin 36 and 44 coacting with pin 38. A bell crank 46 is pivoted to a frame member 48 by means of pivot pin 50. The bell crank carries a pin 52 which is lodged in a slot 54 formed in the reciprocating member 40. The arrangement is such that as the bell crank 46 rotates, the reciprocating member 40 will move upwardly and downwardly. As it moves downwardly the cam slots 44 and 42 will cam the member 40 to the left, as viewed in Figures 1 and 7. The member 40 is formed with a plurality of lugs 56 which project outwardly. The lower surface 60 of each lug 56 is square and acts as a stop, as will be pointed out more fully hereinafter. A traveling cam member 62, shown in perspective in Figure 5, is mounted for movement up and down the channel member 30. It is formed with a cam portion 64 adapted to rest on the flange 28 in the path of the wire shelf cranks 22. As the traveling member 62 moves upwardly its cam portion 64 will pull the crank 22 to the left away from the flange 28 to the open space 66, permitting the shelf to pivot the wire 18 to dump the merchandise supported by the shelf. A second cam member 68 is secured to the member 62 by means of a pin 70. This cam member is formed with an upper inclined cam surface 71 and a lower inclined cam surface 72. A right angle cam 74 is also secured to and carried by the member 62. After the shelves have all been tipped, the right angle cam surface 74, when the cam member is moved downwardly, will rotate the shelf wire ninety degrees, thus raising the shelf to a horizontal position. In this position the cam surface 72 will push the crank 22 to the right upon further downward motion of the cam assembly, as viewed in Figure 7, thus re-erecting the shelf and permitting the flange 28 to hold the shelf in horizontal position by coaction with the crank 22, thus holding the bent wire portion 20 in a horizontal position. It will be seen that the member 62 is formed with a cam surface 64 adapted to dump the shelves and carries a pair of cams 74 and 72 adapted to re-erect the shelves after they have been dumped by successive action. The member 62 and its associated cams is constantly urged upwardly by a negative spring 76 carried adjacent the top of the assembly in any suitable manner from the frame. The length of the negative spring is sufficient to permit the cam-carrying member 62 to move from the position shown in Figure 1 just below the bottom shelf to past the uppermost shelf. The negative spring is normally wound in a tight coil about a shaft 78 carried by the frame above the shelf assembly. The negative spring does not change its pull over long extensions but tends constantly to reassume its spiral shape when stretched or pulled outwardly. The lower end of the negative spring 76 is secured to the member 68 by means of a pin 69. The traveling member 62 carries a pin 80 which loosely supports a latching member 82 shown in Figure 6 normally urged to the right by a spring 84 so that the toe 86 of the latching member is normally lodged in an opening 34 formed in the flange 32 of the channel member 30. The latch normally prevents the spring 76 from moving the traveling member upwardly. The position of parts is normally as shown in Figure 3, in which the member 62 is prevented from being moved upwardly by the spring 76 due to the engagement of the toe 86 of the latch 82 in the opening 34 formed in the flange 32. The reciprocating member 40, furthermore, is normally positioned substantially in the same plane as the toe 86 so as this member 40 moves downwardly and to the left the member 40 will push the toe 86 out of a slot 34 against the action of spring 84, permitting the member 62 to move slightly upwardly to engage the stop member 60 positioned immediately above the opening 34 from which it was just displaced. When the purchasing cycle is completed, the reciprocating member 40 moves upwardly and inwardly again. The upward motion permits the traveling member 62 to move upwardly until its latch is free of the stop 60, the toe of the latch 60 remaining on the outside of flange 32 of the channel member. The upward motion continues until the toe 86 lodges in the opening 34 just above the opening from which it was just dislodged, stopping the traveling member in a position for the next purchasing cycle to dump the next shelf. The upward motion of the traveling member 62 carries the cam surface 64 upwardly permitting it to engage the crank 22, camming it from the flange 28 into the open space 66 formed in the traveling member and permitting the crank to rotate outwardly, dumping the merchandise as the shelf pivots, since it is no longer supported. It will be noted that the traveling member 62 is formed with a rear projection 61 adapted to permit the traveling member to clear the cranks in their outward position. The angle cam 74 is positioned above this outward member and is adapted to re-erect the shelves by pivoting the cranks, as pointed out above. It is to be noted, furthermore, that the area into which the cranks pivot is normally covered by the negative spring 76. This spring moves upwardly and clear of the cranks just before the cam 64 reaches the crank to be tripped. In this manner the spring 76 precludes all of the shelves above the traveling member 62 from pivoting. This arrangement prevents an accidental dumping of a shelf by jarring the machine in an attempt to move one of the wires laterally by inertia. Inasmuch as each shelf 24 is loosely pivoted to the wire 18 by means of brackets 17 and is held against lateral movement by contact with the flanges 14 and 16, it is impossible to move the shelf laterally. The weight of the shelf and merchandise on the wire will prevent the small mass of the wire from being jarred laterally. In the untoward contingency that this might happen, the negative spring 76 will still preclude an accidental discharge of merchandise. If one of the cranks 22 happens to have been dislodged, the upper cam surface 71, shown in Figure 7, formed on the member 68, will cam the crank 22 back onto the flange 28 in a position permitting the cam 64 to operate upon it. It will be clear that unless the crank 22 is in the correct position, the cam 64 will not engage it properly and this may cause a jam in the machine, so that the upper cam surface 71 serves a useful purpose.

A plurality of plungers 100 are mounted for reciprocating movement on the frame 12 which is formed with a plunger housing 102. To each of the plungers is secured a pull member 104 having a handle 106. A plurality of slides 108 are mounted above the plunger assembly. Each plunger 100 carries a cam 110 adapted to cam the slides 108. The arrangement is such that when one plunger 100 is operated, all of the other plungers are locked against operation. This locking construction is well known to the art and forms no part of the instant invention. Each plunger 100 is formed with a depending member 112 positioned behind a locking bar 114. When a handle 106 of a plunger is pulled, the locking bar 114 must first be released before any movement may be imparted to the plunger 100. This locking bar extends across all of the plungers and locks them all. When proper coins are deposited in the coin register associated with my machine, the locking bar is unlocked so that one of the plungers may be pulled. It in turn, when pulled, through the cam 110 and the slides 108 locks all of the other plungers. A pivoted member 116 is carried by each depending member 112. After the plunger moves to the left, as viewed in Figure 1, the inclined surface 118 will rotate the pivoted member 116 in a clockwise direction, as viewed in Figure 1, to embrace the locking bar 114. The elevated surface 120 formed at the bottom of the plunger housing maintains the pivoted member in engaged position. The arrangement is such that the locking bar 114 will be returned to its initial position by the movement of the plunger 100 to the right. Each plunger 100 has an upwardly extending portion 122 formed integrally therewith adapted to slide through slots 124 formed in the plunger housing, as can readily be seen by reference to Figure 4. Each member 122 supports a bracket 126 to which is secured a roller 128 adapted to extend into the path of the bell crank 46 associated with the column. Referring now to Figure 3, the bell crank 46 is normally locked against rotary movement in a clockwise direction by a latch 130 urged to locking position by a spring 132 secured to a pin 134 carried by the frame. The latch 130 acts against a lug 136 formed on the frame part 48 to which the bell crank 46 is pivoted. The latch 130 is formed with a projection 138 which is adapted to be engaged initially by the roller 128 as the plunger is moved to the left. This movement rotates the latch in a counterclockwise direction, as viewed in Figure 3, around its pivot 140 to free it from the lug 136. The roller then starts to rotate the bell crank 46 in a clockwise direction acting against the cam surfaces 142 and 144 formed at the bottom of the bell crank. In rotating the bell crank in a clockwise direction, the reciprocating member 40 is moved downwardly by means of the pin 52 carried by the bell crank and the slot 54 formed in the reciprocating member 40. At the same time the reciprocating member will move to the left to unlatch the member 62, as pointed out above. The traveling member is not freed by this outward movement and it is only when the plunger 100 is returned to its initial position that the purchase is completed. When the plunger is moved back to the right by pushing in upon the handle 106 the bell crank toe 148 will have its lower cam surface 150 engaged by the roller 128 to rotate the bell crank in a counterclockwise direction, thus raising the reciprocating member 40 moving it inwardly and permitting the traveling member 62 to complete its upward step movement to complete the purchase. By this time the latch 130 will have engaged the lug 136 or its upper companion lug 137 so that the plunger cannot again be operated until the locking bar 114 is returned to its locked position where it must be freed by the deposit of a second coin.

An empty locking hook 170 is pivoted to the upward extending member 122 by means of a pin 172, as can readily be seen by reference to Figures 1 and 4. The hook end 174 of the locking lever 170 is longer than the abutment end 176. The hook is adapted, when a column is empty, to lodge in an opening 178 formed in the frame 12 adjacent the plunger housing so that the plunger 100 with which the locking member is associated cannot be pulled when the hook 174 is lodged in the opening 178. The locking lever 170 is normally held in nonlocking position by an abutment plate 180 normally urged downwardly by a spring 182, as can readily be seen by reference to Figure 4. The reciprocating member 40 carries a pin 184 which extends through an appropriate slot into the path of the cam member 64. After the uppermost shelf is dumped, the traveling member 62 will slide upwardly past the uppermost opening 34 until its cam 64 engages the pin 184 which is placed in a position similar to one of the arms 22. The member 40 will be lifted by the spring, the slots 44 and 42 having dependent portions permitting this upward motion. The member 40 is provided adjacent its bottom with a flange 186 which is adapted to engage a flange 188 formed at the upper portion of the abutment plate 180 lifting the abutment plate against the action of spring 182, thus permitting the locking lever to pivot in a clockwise direction, as viewed in Figure 1, so that the hook 174 will become lodged in the opening 178, locking the plunger.

In operation, let us assume that the machine is loaded, that all of the shelves are erected and that merchandise such as candy bars or the like is in place on the shelves. All the weight of the shelves will be carried by the flange 28 through the medium of the cranks 22. The traveling member is in its lowermost position with the spring 84 holding the toe 86 of the latch 82 in the lowermost opening 34 formed in the channel member 32. The plunger handle 106 cannot be pulled because the locking bar 114 has not yet been released. The empty lock locking lever 170 is in nonlocking position due to the spring 182 holding the abutment plate 180 against the abutment end 176 of the locking lever. When proper coins are deposited in the coin register the locking arrangement forming part of the coin register and no part of the instant invention releases the locking bar 114 permitting one of the plungers 100 to be pulled. As soon as one of the plungers has been pulled, the plunger cam 110 operates the slide 108 to immobilize the remaining plungers. The motion to the left, in Figures 1 and 3, of the plungers 100 carries the plunger extension 122 to the left and hence the roller 128. The roller first contacts the toe 138 of the locking latch 130 and unlocks the cam 146. The roller then strikes the surface 142 and rolls along the surface 144, camming the crank 46 to rotate in a clockwise direction, as viewed in Figures 1 and 3, carrying the pin 52 downwardly and pulling the reciprocating member 40 downwardly. The downward motion of the member 40 causes it to move simultaneously to the left due to the cam slots 42 and 44 coacting with the stationary pins 36 and 38. The member 40 in this leftward motion engages the toe 86 of the latch 82 of the traveling member 62, forcing it out of the opening 34 in which it is lodged against the action of spring 84. The traveling member moves upwardly a short distance until the toe 86 of the latch engages the stop 60 immediately above it bringing the cam 64 close to the crank 22 of the bottommost shelf support 18. The motion to the right of the plunger will rotate the crank 46 in a counterclockwise direction and move the reciprocating member 40 upwardly permitting the traveling member to ride upwardly with it. At the same time the reciprocating member 40 is cammed to the right by means of its cam slots coacting with the pins 36 and 38. As soon as this motion to the right clears the stop surface 60 from the toe 86 of the traveling member, the negative spring 76 will cause the traveling member to travel upwardly until the toe 86 engages the upper portion of the opening 34 immediately above the one from which it was just dislodged. This upward motion of the traveling member 62 causes the cam 64 to cam the crank 22 to the left clear of the supporting flange 28, permitting the shelf to dump so that the merchandise 26 will fall to the delivery chute where it may be taken by a purchaser.

During the return movement of the plunger the latch 116, which has been pivoted around the bar 114 and held in this position by the bottom plate 120 of the plunger housing, moves the locking bar 114 to the right back to a position in which it is again locked just as the purchase is being completed so that it will be necessary to deposit coins again to free the locking bar 114 for the next purchase. As successive purchases are made, the traveling member moves upwardly stepwise freeing successive shelves from the bottom to the top until the uppermost shelf is dumped. At this time the traveling member 62 moves upwardly as soon as it is clear of the uppermost detent 60 formed in the member 40 until the cam 68 strikes the pin 184 moving the reciprocating member 40 upwardly so that its lower flange 186 lifts the coacting flange 188 against the action of spring 182, lifting the abutment plate 180 to permit the empty locking lever 170 to pivot to locking position.

When the machine is to be reloaded the traveling member is moved downwardly by hand against the action of the negative spring 76. The first downward motion permits the reciprocating member 40 to move downwardly by gravity permitting the spring 182 to reseat the abutment plate 180, tilting the locking lever to nonlocking position. As the movement is continued downwardly, the cam member 74 will engage the ends of the cranks 22 which are projecting to the dotted line position 22' in Figure 4, moving them into the path of the cam surface 72 formed on the member 68 which is secured to and carried by the traveling member 62. The cam surface 72 will cam the cranks inwardly so that their ends rest upon flange 28 in a position so that the wires 18 will support the shelves 24 in horizontal position. Each shelf is successively erected by the downward motion of the traveling member 62 which can be moved easily with a continuous motion until it reaches the bottom of the channel member 32. At this time all the shelves will be erected and merchandise 26 may be placed on the shelves easily. The cabinet is formed with a customary front door normally locked so that it may be swung open to give free access to the traveling member for the purpose of re-erecting the shelves and reloading the machine with merchandise.

It will be seen that I have accomplished the objects of my invention. I have provided a candy merchandising machine adapted to vend articles which cannot be stacked, in a simple, convenient and expeditious manner, in which the pull on an operating handle to operate the machine is greatly lessened. I have provided a candy merchandising machine for candy bars and other articles which cannot be stacked having a large capacity. My candy merchandising machine is flexible in design, simple and inexpensive in its construction and certain in its operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A merchandising machine including in combination a frame, a plurality of shelf-supporting means pivotally carried by the frame vertically positioned one above the other, each of said shelf-supporting means being formed with a crank adapted to rest upon the frame to erect the shelf-supporting means and mounted for movement longitudinally of the axis of rotation of the supporting means, shelves carried by said shelf-supporting means adapted to support merchandise to be vended, means for restricting movement of the shelves longitudinally of the axis of the shelf-supporting means, a cam, means for mounting said cam for vertical movement along the frame and into successive engagement with the cranks of the shelf-supporting means, means for biasing said cam to move upwardly, stop means carried by said cam, a plurality of coacting stop means carried by said frame adapted to stop the cam below each shelf-supporting crank, and coin controlled means for successively releasing said stop means to permit said biasing means to move the cam upwardly in an intermittent stepwise manner.

2. A merchandising machine as in claim 1 in which said biasing means comprises an elongated flat spring, means for mounting said spring above the uppermost shelf, one end of said spring being secured to said cam, said spring extending adjacent said cranks in a position to prevent the cranks above the cam member from rotating to dump the merchandise supported on the shelves.

3. A merchandising machine as in claim 1 in which the stop means carried by the cam comprises a spring-pressed pawl and said coin controlled means comprises a reciprocating member formed with a pawl-releasing cam, and means for reciprocating said reciprocating member.

4. A merchandising machine as in claim 1 in which said cam stop means comprises a pawl, and said coin controlled means comprises a reciprocating member, a plurality of pawl-releasing cams carried by said reciprocating member, a plurality of stop means carried by said reciprocating member, means for reciprocating said reciprocating member to move one of said reciprocating member cams to engage the pawl to release the traveling cam from the frame coacting stop means adjacent one of said shelves to permit the biasing means to move the cam upwardly to engage the reciprocating member stop means, and means associated with said reciprocating member for releasing the pawl upon movement of the reciprocating member in the reverse direction to permit the traveling cam to move upwardly to engage the shelf-supporting crank and to stop in the frame coacting means next above the one from which the pawl was just released.

5. A merchandising machine as in claim 1 in which said cam is formed with a second cam surface adapted to engage the cranks in released position to rotate the shelf-supporting means to erect position and to cam the cranks inwardly upon downward movement of said cam against the action of the biasing means.

6. A merchandising machine as in claim 1 in which said coin controlled means includes a plunger, a bar normally immobilizing said plunger, coin operated means for releasing said bar, a reciprocating member adapted to release the cam stop means, and crank means operable by said plunger for reciprocating said reciprocating member.

7. A merchandising machine as in claim 1 in which said coin controlled means includes a plunger, a bar normally immobilizing said plunger, coin operated means for releasing said bar, a reciprocating member adapted to release the cam stop means, crank means operable by said plunger for reciprocating said reciprocating member, means carried by said reciprocating member above the uppermost shelf in the path of said cam adapted to be engaged by said cam after the uppermost shelf has been tripped to move said reciprocating member upwardly, a plunger locking means, means normally rendering the plunger locking means inoperative, and means responsive to an upward movement of said reciprocating member due to came travel past the uppermost shelf for rendering said locking means operative whereby to prevent the operation of said plunger after the uppermost merchandise shelf has been tripped.

8. A merchandising machine as in claim 1 in which said biasing means comprises a negative spring, means for mounting one end of said negative spring on the frame above the uppermost shelf, and means for securing the other end of said negative spring to said cam.

9. A merchandising machine as in claim 1 in which said coin controlled means includes a plunger, a bar normally immobilizing said plunger, coin operated means for releasing said bar, a reciprocating member adapted to release the cam stop means, crank means operable by said plunger for reciprocating said reciprocating member, and means responsive to movement of the plunger for connecting said plunger to said bar whereby return movement of the plunger will constrain the bar to move therewith.

CHRISTIAN GABRIELSEN.

References Cited in the file of this patent

UNITED STATES PATENTS

| Number | Name | Date |
|---|---|---|
| 749,535 | Dawes | Jan. 12, 1904 |
| 1,916,530 | Richardson | July 4, 1933 |
| 2,128,179 | Du Grenier | Aug. 23, 1938 |
| 2,296,246 | Gabrielsen | Sept. 22, 1942 |
| 2,543,687 | Carlson | Feb. 27, 1951 |